US006806892B1

(12) United States Patent
Plow et al.

(10) Patent No.: US 6,806,892 B1
(45) Date of Patent: Oct. 19, 2004

(54) LAYER VIEWPORT FOR ENHANCED VIEWING IN LAYERED DRAWINGS

(75) Inventors: Gregory Maurice Plow, Gilroy, CA (US); Farrokh E. Pourmirzaie, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/467,503

(22) Filed: Dec. 20, 1999

(51) Int. Cl.$^7$ ................................................. G09G 5/00
(52) U.S. Cl. ...................... 345/781; 345/766; 345/788; 345/790; 345/797
(58) Field of Search ......................... 345/700, 764–766, 345/781, 788, 790, 794–800

(56) References Cited

U.S. PATENT DOCUMENTS

| | | | |
|---|---|---|---|
| 5,204,947 A | | 4/1993 | Bernstein et al. |
| 5,265,202 A | | 11/1993 | Krueger et al. |
| 5,283,560 A | | 2/1994 | Bartlett |
| 5,581,670 A | | 12/1996 | Bier et al. |
| 5,590,265 A | | 12/1996 | Nakazawa |
| 5,638,501 A | | 6/1997 | Gough et al. |
| 5,651,107 A | * | 7/1997 | Frank et al. ................. 345/768 |
| 5,689,666 A | * | 11/1997 | Berquist et al. ............. 345/797 |
| 5,754,186 A | | 5/1998 | Tam et al. |
| 5,764,229 A | | 6/1998 | Bennett |
| 5,805,163 A | | 9/1998 | Bagnas |
| 5,831,615 A | | 11/1998 | Drews et al. |
| 5,896,131 A | * | 4/1999 | Alexander ................... 345/634 |
| 5,920,313 A | * | 7/1999 | Diedrichsen et al. ........ 345/767 |
| 5,956,030 A | * | 9/1999 | Conrad et al. .............. 345/769 |
| 6,002,397 A | * | 12/1999 | Jaaskelainen, Jr. .......... 345/805 |
| 6,163,318 A | * | 12/2000 | Fukuda et al. .............. 345/803 |
| RE37,722 E | * | 5/2002 | Burnard et al. ............. 345/764 |

* cited by examiner

*Primary Examiner*—Kristine Kincaid
*Assistant Examiner*—Nhon Nguyen
(74) *Attorney, Agent, or Firm*—Sawyer Law Group LLP

(57) ABSTRACT

The present invention provides a method, system, and computer readable medium for viewing hidden windows on a display including a plurality of application windows, a portion of at least one application window of the plurality of application windows being obscured. The method, system, and computer readable medium comprise creating a viewport displayed as a topmost application window in response to a user interaction and displaying at least a portion of the at least one application window being obscured in the viewport. Through the use of the present invention a user can simultaneously view information from multiple applications where one or more application windows are partially or wholly covering needed information in an underlying application window. Furthermore, the user will also be able to view application windows that are not directly underneath the primary application window, but are in an inactive state. This will provide the user with the ability to quickly access needed information without having to undergo the time consuming process of resizing, minimizing, or rearranging desktop windows.

32 Claims, 13 Drawing Sheets

LAYER VIEWPORT FOR ENHANCED VIEWING IN LAYERED DRAWINGS

FIELD OF INVENTION

The present invention relates generally to a system and method for the use of an application tool to facilitate the viewing of normally hidden information in a multiple application window environment.

BACKGROUND OF THE INVENTION

A windows type desktop such as IBM OS2 or Microsoft Windows provides the user with substantial flexibility in managing the look of the desktop while interfacing with applications. Functions are provided that enable the desktop user to size application windows, move application windows, overlay application windows and to reduce application windows to icons. An application icon provides only the identification of the deployed application with no other information related to the application visible on the desktop. FIG. 1 illustrates an example of a conventional display screen 25 containing desktop icons 15, an application window 20, a minimize button 10, a window reduction/enlargement button 12, a close button 14, an application title bar 16, an application tool bar 18, and scroll bars 22, 24. Application icons 28, are located in the taskbar 26.

Over the years, more and more applications are typically available for activation from the desktop. Generally users are also deploying an increasing number of applications that are concurrently in some state of execution. As this trend continues, even more flexibility for managing the desktop is needed to provide the user with the best productivity from her desktop system. More particularly, when information from two different application windows is needed, the desktop user is forced into one of several methods which can be time consuming and detrimental to her productivity. One such method involves reducing one or more applications windows to an icon such that the underlying application window and information may be viewed. Another method involves selecting the icon representing the application (or selecting a portion of the application window if not completely covered) that contains the needed information as a means to bring that application window to the top of the desktop.

This problem becomes more evident when dealing with overlapping application windows. FIG. 2 is illustrative of a situation involving a primary application window 30 and an overlapped application window 40. When there is a need for the simultaneous viewing of information contained in the windows 30, 40, the user must resize the corresponding application windows and arrange them on the desktop so as to make both sets of needed information simultaneously viewable. After viewing the needed information, the user typically resizes the application windows 30, 40 back to their original size to facilitate the easy viewing of each application windows without causing undue eyestrain. When all the user wants is a quick look at some information in one application for comparison or manipulation in the other application, the conventional methodology is a time consuming and annoying procedure.

Productivity is further impacted when the needed information is located in an application window that is not directly beneath the primary application window. If a user is working on a document in the primary application window, he might be interested in a document that is several layers beneath the primary application window. Further, the document of interest may be a completely different application. Typically, the user would have to resize, move, and minimize windows on the desktop screen in order to view multiple documents or applications of interest. This process is time consuming and can cause the user to become distracted.

Another drawback to the conventional methodology relates to a user's inability to quickly move or relocate information from one window to another document. In order to do this, a user would typically have to disrupt the viewing of a primary application window to locate the desired information to cut and paste.

What is needed is a method for viewing the contents of an application window that would otherwise be hidden. This will provide the user with the ability to quickly access needed information without having to undergo the time consuming process of resizing, minimizing or rearranging desktop windows.

SUMMARY OF THE INVENTION

The present invention provides a method, system, and computer readable medium for viewing hidden windows on a display including a plurality of application windows, a portion of at least one application window of the plurality of application windows being obscured. The method, system, and computer readable medium comprise creating a viewport displayed as a topmost application window in response to a user interaction and displaying at least a portion of the at least one application window being obscured in the viewport.

Through the use of the present invention a user can simultaneously view information from multiple applications where one or more application windows are partially or wholly covering needed information in an underlying application window. Furthermore, the user will also be able to view application windows that are not directly underneath the primary application window, but are in an inactive state. This will provide the user with the ability to quickly access needed information without having to undergo the time consuming process of resizing, minimizing, or rearranging desktop windows.

DETAILED DESCRIPTION OF THE INVENTION

The present invention provides a method and system for viewing previously hidden application windows. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

The present invention allows a user to view information in application windows that are obscured by one or more other application windows. The preferred embodiment allows the user to view information in windows that may or may not be directly beneath the primary application window. This will provide the user with the ability to quickly access needed information without having to undergo the time consuming process of resizing, minimizing, or rearranging desktop windows.

Figure 1:
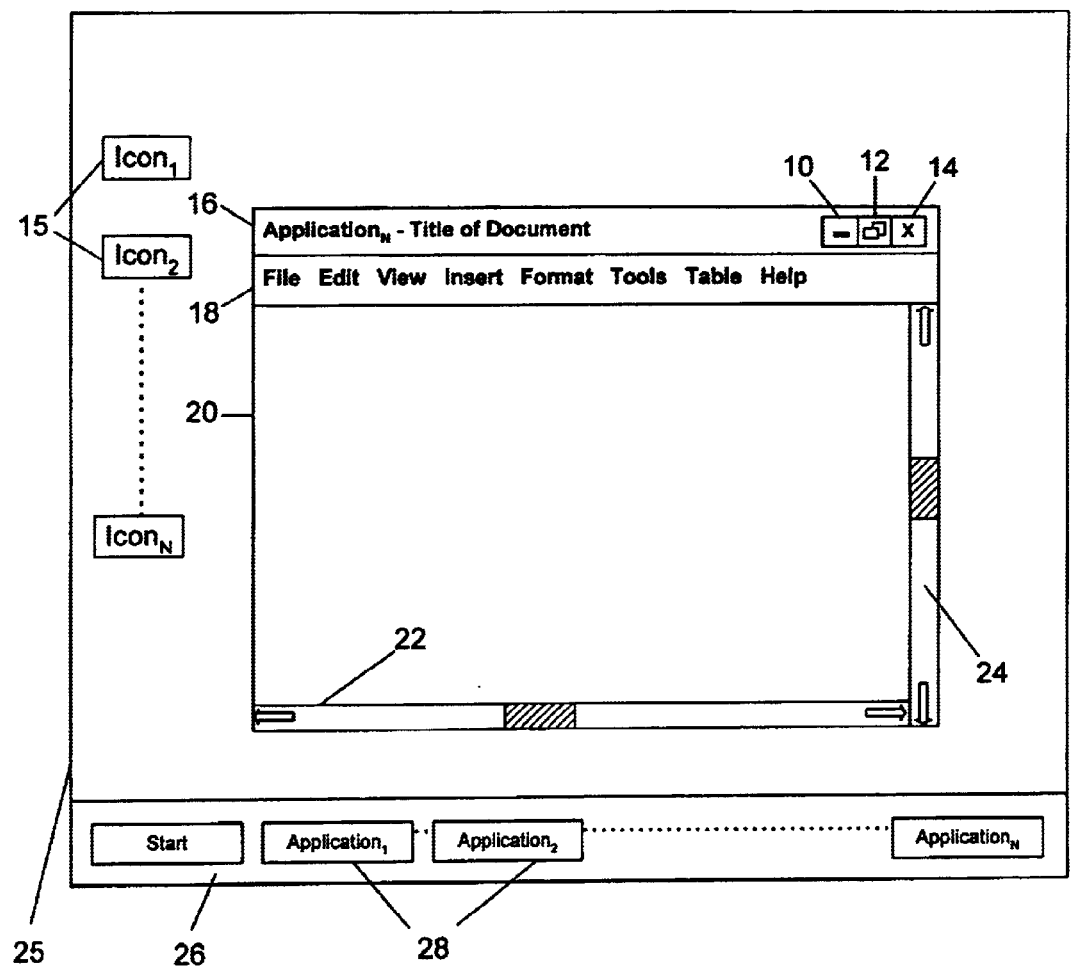
FIG. 1 shows a conventional application window configuration.
Figure 2:
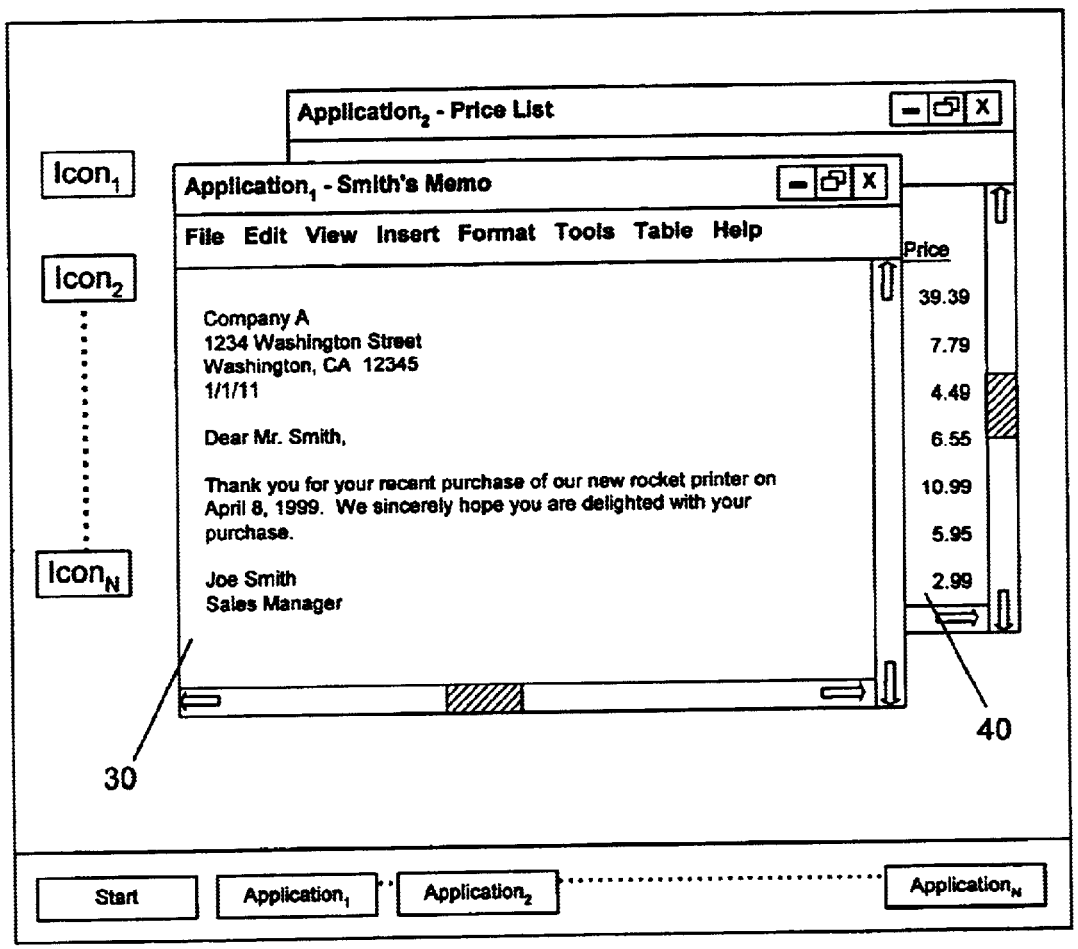
FIG. 2 shows conventional overlapping application windows.
Figure 3:
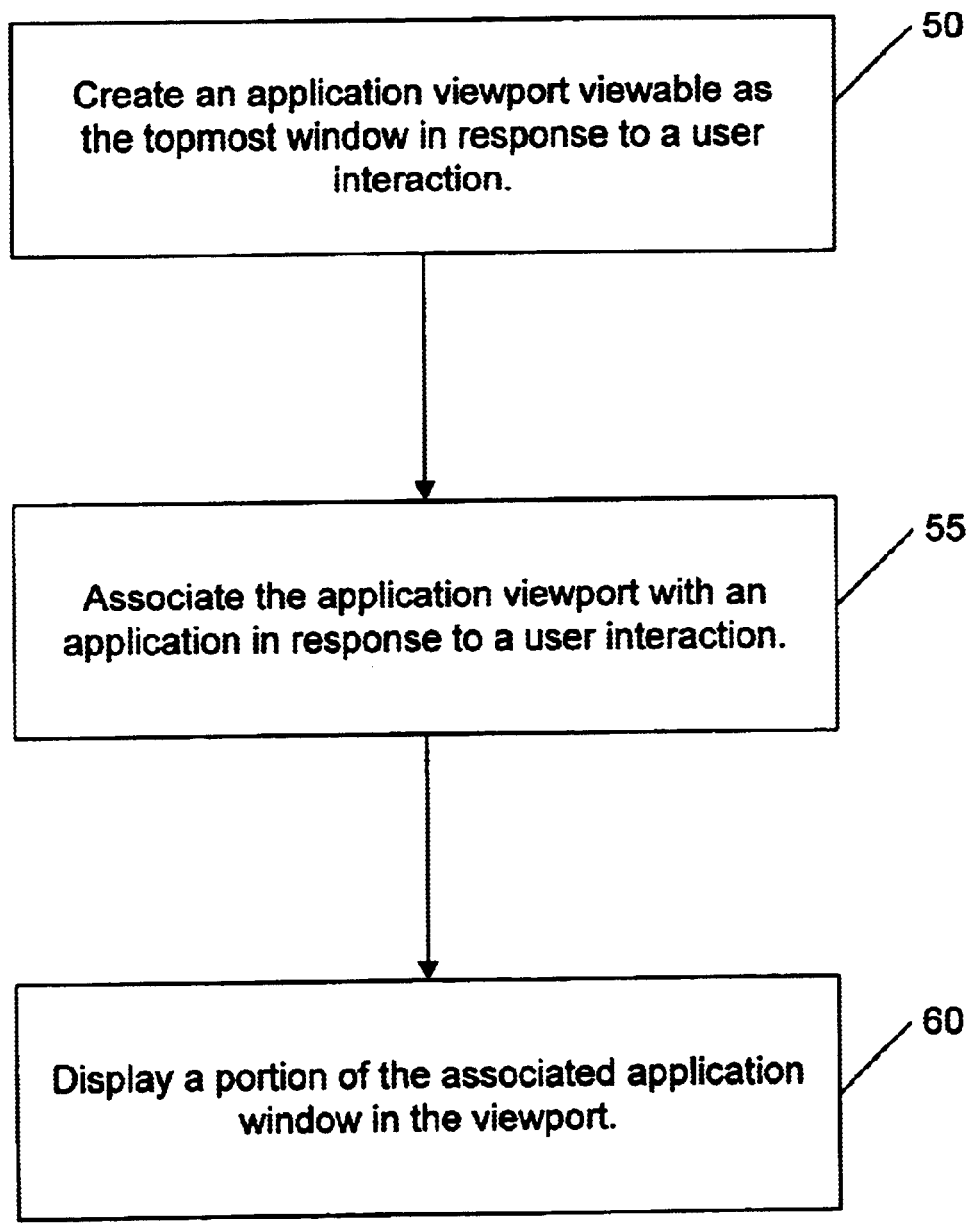
FIG. 3 shows a high-level flowchart of the method in accordance with the present invention.

To describe the operation of the method in accordance with the present invention, refer now to FIG. 3. FIG. 3 is a high-level flowchart of a method in accordance with the present invention. First, an application viewport, displayed as the topmost window, is created in response to a user interaction, via step 50. Next, an application is associated with the viewport in response to a user interaction, via step 55. Next, a portion of the associated application window is displayed in the viewport, via step 60. Note that by default, the application viewport has an initial size and is associated with the primary application window when it is first created. It is also preferable that the application viewport have the ability to view information from different application programs. For example, information from a Microsoft Word application window could be displayed in the viewport as the topmost window, while the primary application window displays information from a Microsoft Excel application.

In a preferred embodiment, the application viewport is created using a desktop tool that can be selected by the user for the creation of a variable sized application viewport. The tool is preferably selected from the Start Menu or a desktop icon. The viewport allows a user to view a portion of a window that is obscured by one or more layers of windows. In addition, the viewport allows a user to view information in an application window different from the primary application window.

Figure 4:
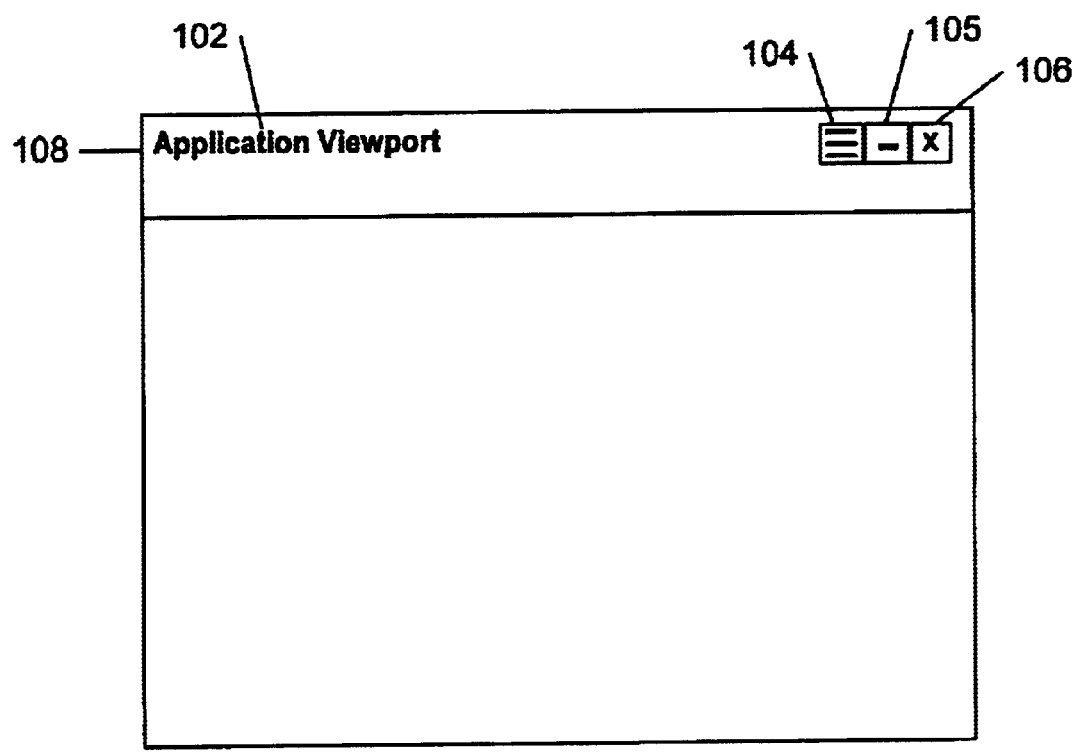
FIG. 4 is a diagram of an application viewport in accordance with the present invention.

FIG. 4 represents an application viewport 100 in accordance with the present invention. The title 102 of the application currently being associated with the viewport is postfixed with the word "viewport" and placed in the title bar 108. Also included are a minimize all button 104, a minimize button 105, and a close button 106. Once created, the application viewport can be moved about the desktop or resized and allows a user to view an associated application window even though that application window is otherwise hidden from view by one or more layers of other windows.

However, a situation can arise when the needed information is within a scrollable area of the associated application window but not yet within the application window. To avoid needing to first bring the associated application window that contains the needed information to the top layer of the desktop, then scrolling to the needed information and finally restoring the primary application window to its original position on the desktop prior to resuming use of the application viewport, it is preferable to incorporate a scrolling feature into the viewport. Accordingly, whenever the viewport is dragged off the associated application window boundaries in a horizontal direction, the application associated with the application viewport scrolls in that same horizontal direction, simulating the effect of allowing the application viewport to move unabated to any area within the associated application window. In like fashion, vertical scrolling occurs when the application viewport is dragged off the associated application window boundaries in the vertical direction.

Figure 5A:
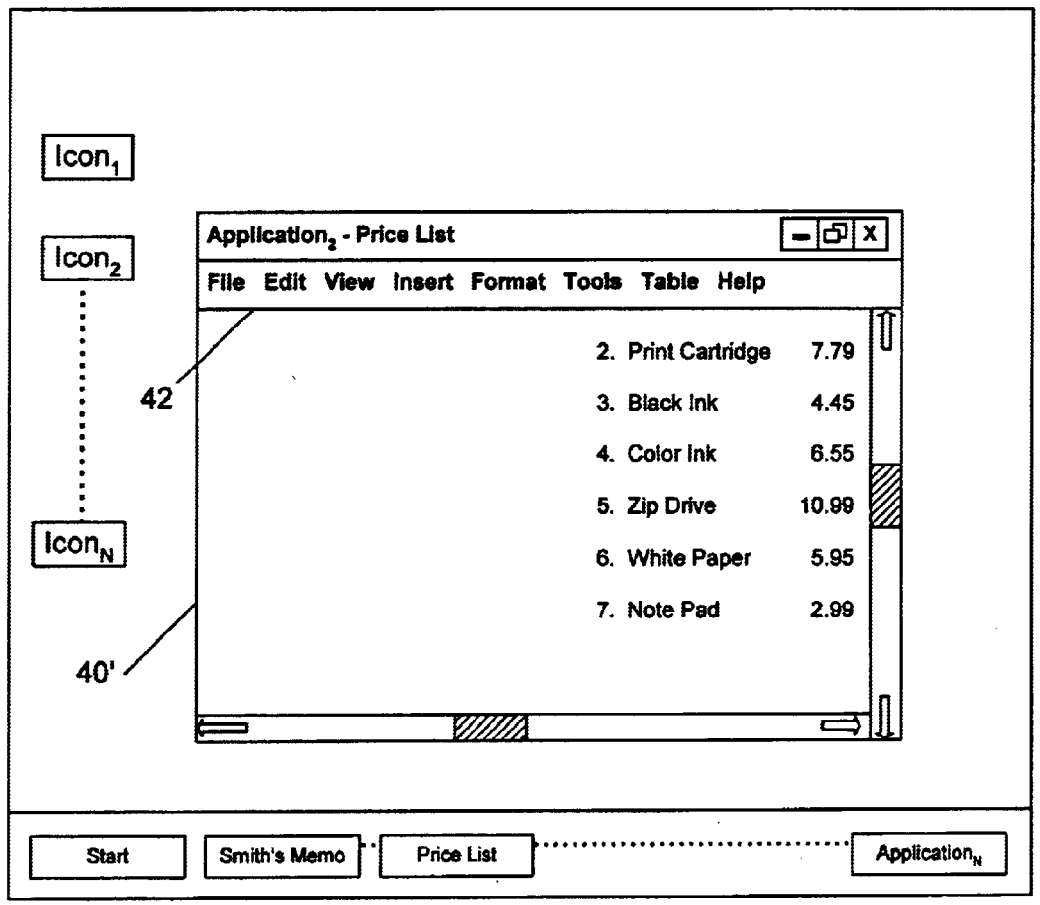
FIG. 5a illustrates an application window.
Figure 5B:
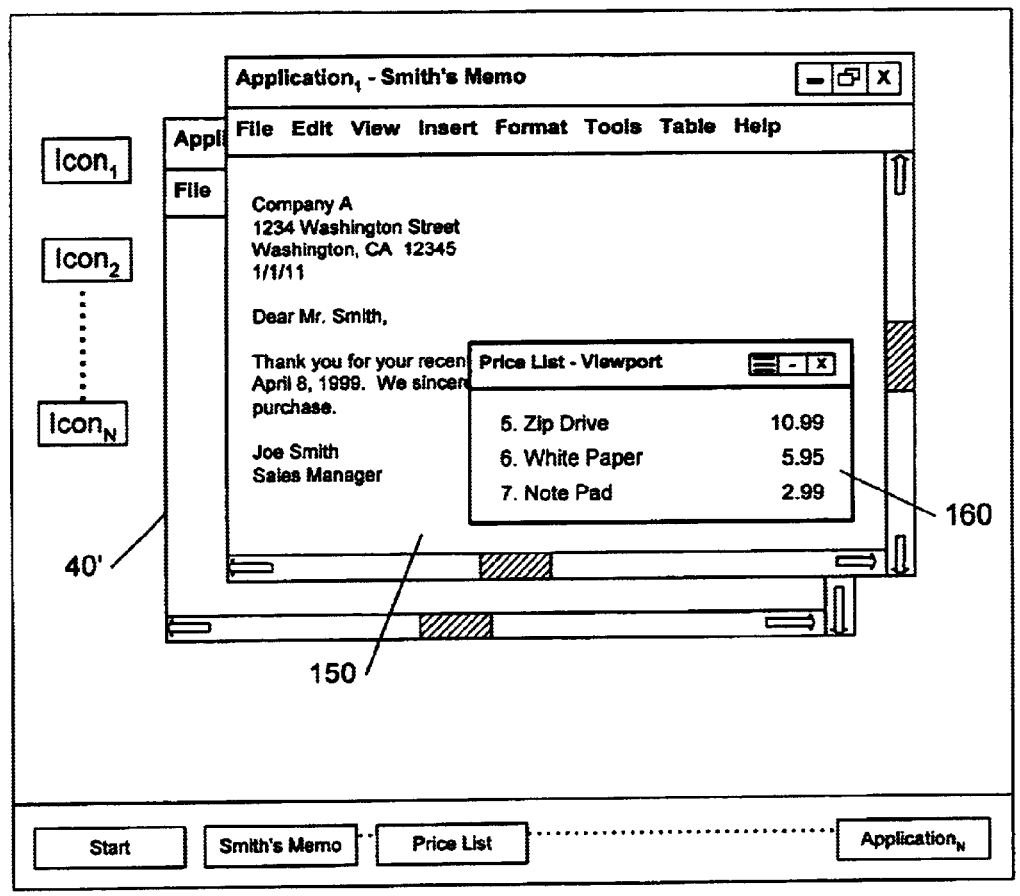
FIG. 5b illustrates an application viewport configuration in accordance with the present invention.
Figure 6:
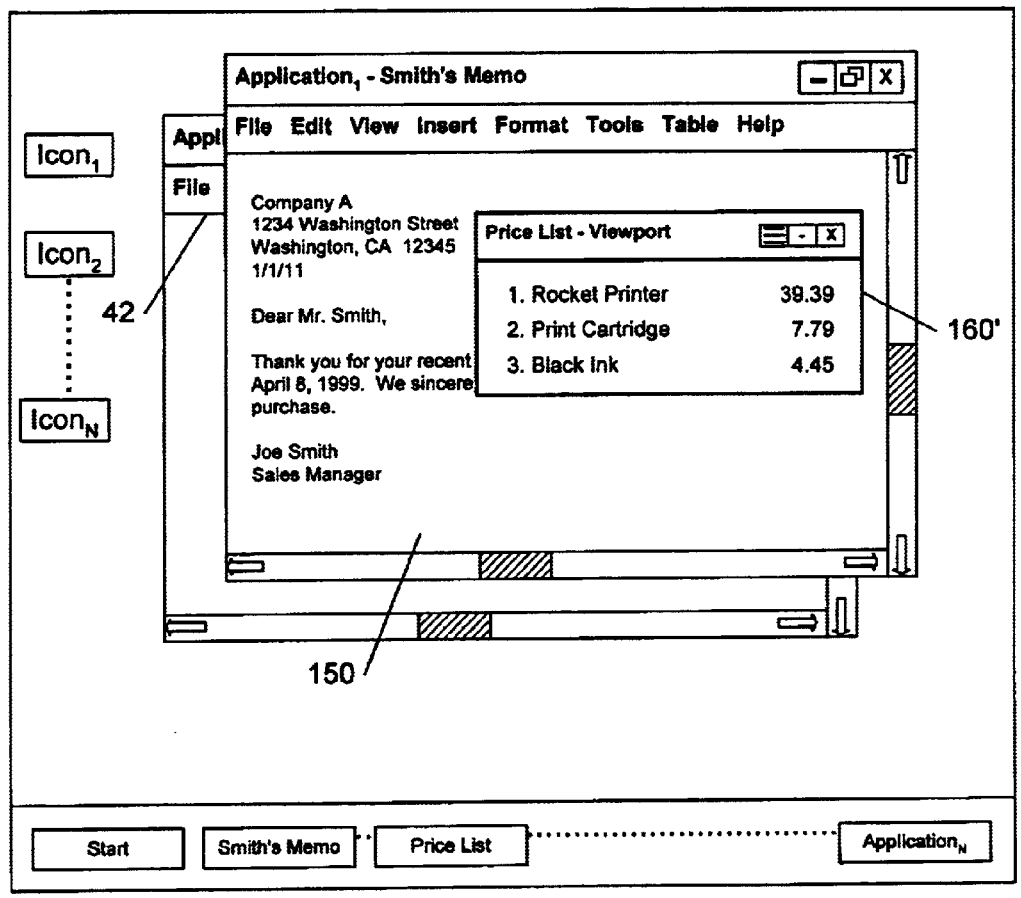
FIG. 6 is a second diagram of an application viewport configuration in accordance with the present invention.

To better understand the scrolling feature, refer to FIG. 5a, FIG. 5b and FIG. 6. FIG. 5a illustrates an application window 40' (e.g. Application$_2$- Price List) wherein the "Rocket Printer" listing is beyond the vertical boundary 42 and is therefore not shown. FIG. 5b illustrates an application viewport configuration in accordance with the present invention wherein the application viewport 160 is associated with the hidden application window 40' and is located within the primary application window 150. FIG. 6 illustrates a second perspective view of the application viewport configuration wherein the application viewport 160' has been dragged to a second position within the primary application window 150 and has reached the associated application window's vertical boundary 42. Accordingly, the application viewport 160' now contains the "Rocket Printer" listing because the associated application window 40' has scrolled in the vertical direction based on the application viewport 160' having been dragged to the associated application window's vertical boundary 42.

Figure 7:
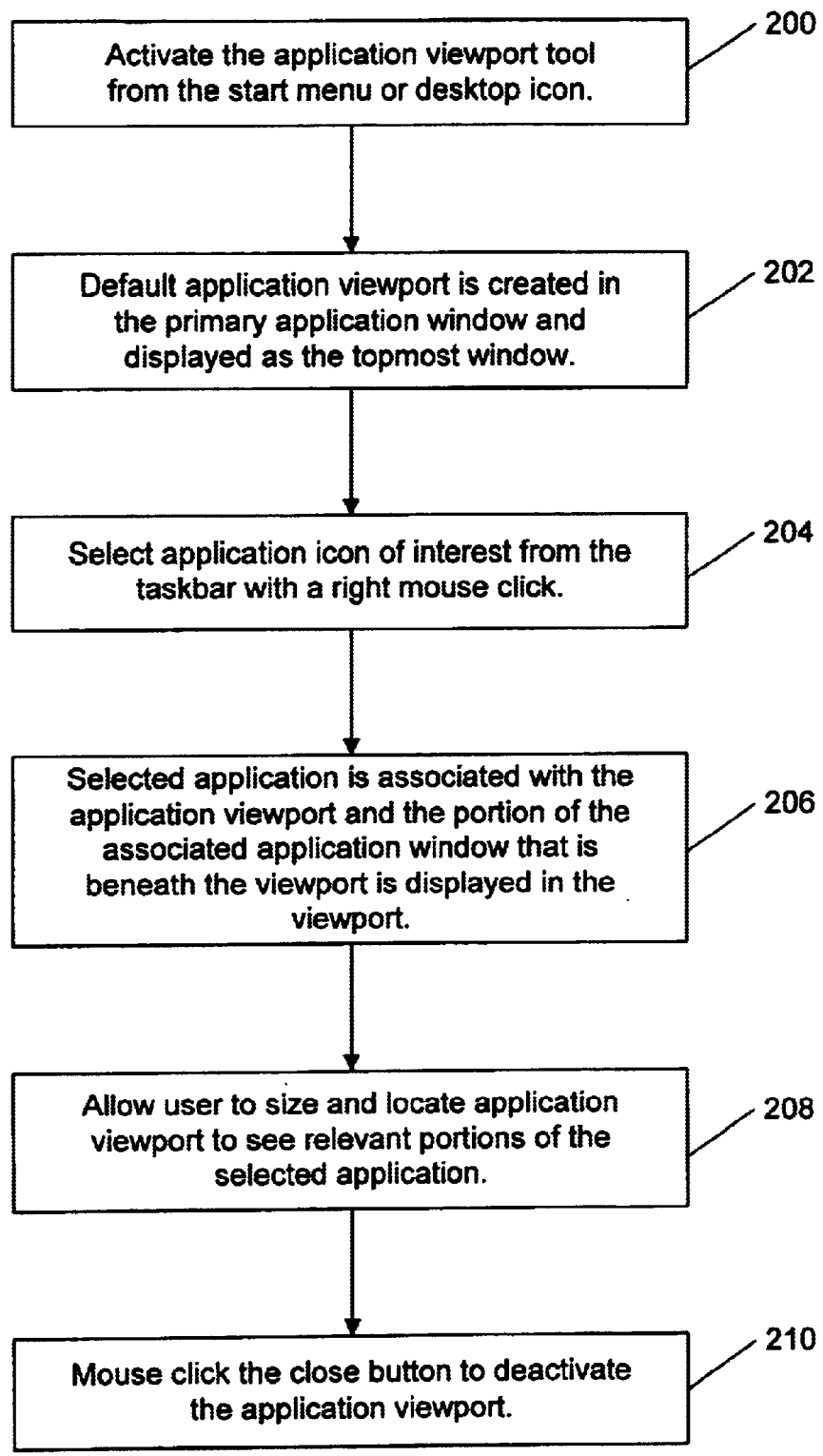
FIG. 7 is a detailed flowchart of the method in accordance with the embodiment of present invention.
Figure 8:
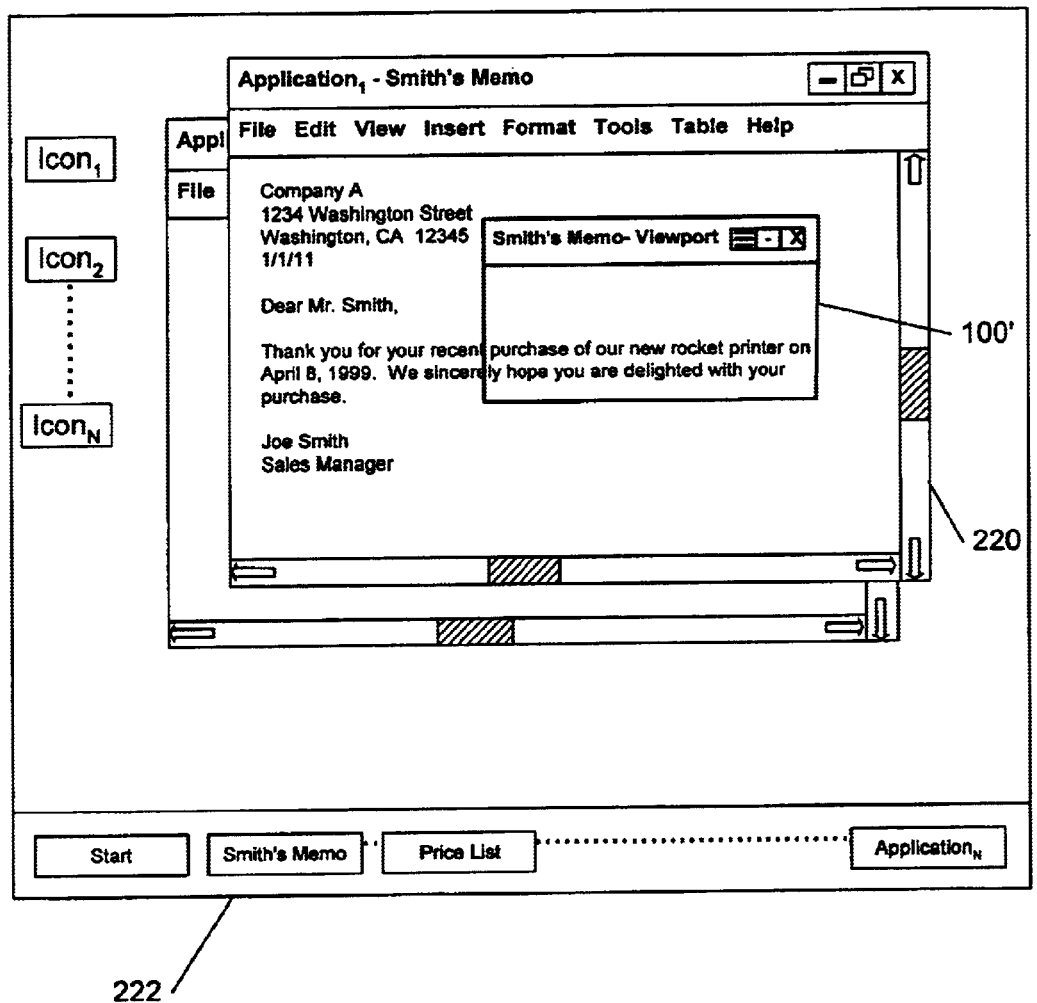
FIG. 8 represents an application viewport configuration in accordance with the present invention.
Figure 8A:
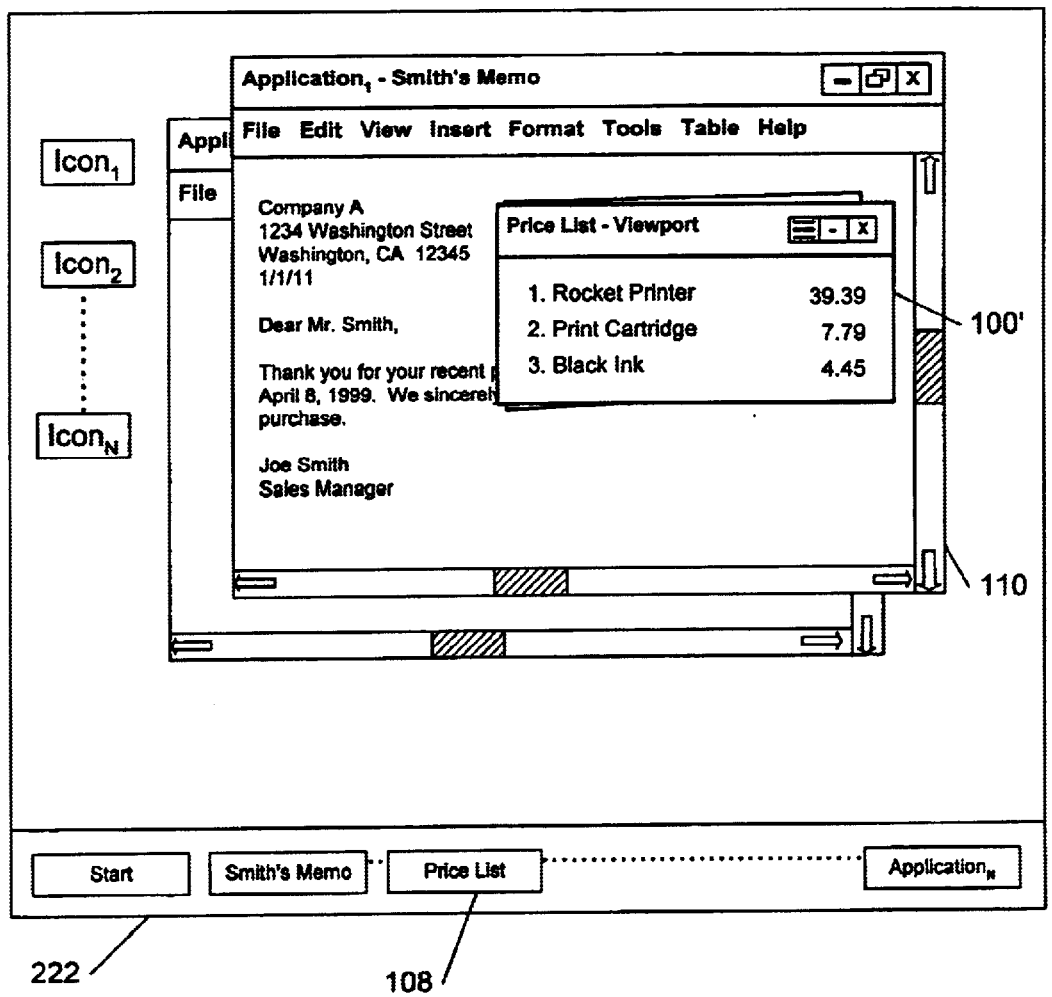
FIG. 8a is another application viewport configuration in accordance with the present invention.

To further demonstrate the operation of the method in accordance with the present invention, refer now to FIGS. 7, 8, and 8a. FIG. 7 is a detailed flowchart of the preferred embodiment of the method in accordance with the present invention. FIGS. 8 and 8a are illustrations of application viewport configurations in accordance with the present invention. Once a user decides to see a previously hidden application window, the user selects the application viewport tool, preferably from the start menu or a desktop icon, via step 200. Next, the application viewport is displayed in the primary application window, via step 202. Initially, the application viewport 100' has a default size and is associated with the primary application window. However, the application viewport can be resized at any time preferably through the use of conventional mouse operations. The user then selects the application icon of interest from the taskbar 222 with a right mouse click, via step 204.

Although the application viewport displayed is initially created with a default size, one of ordinary skill in the art will readily recognize that a variety of methods could be implemented to create and size of the viewport and still remain within the spirit and scope of the present invention. For example, the "click, hold, and drag" method could be utilized. Using this method, a mouse can be utilized to place the cursor at the desired location of the upper left hand corner of the viewport. The mouse button is then depressed and held while the mouse is used to drag the cursor to the desired location of the lower right hand corner of the viewport. The mouse button is then released.

The selection of the application icon of interest is preferably done by right mouse clicking the application icon of interest in the taskbar. However, an alternate method of associating an application window with the application viewport is to depress the "TAB" key while the viewport is active which will cause the various launched applications on the desktop to cycle through the application viewport. The title of the viewport will indicate which application is currently associated with the viewport. FIG. 8 shows the viewport 100' before step 204 where the associated application is the default primary application window 220.

Referring back to FIGS. 7, the selected application is associated with the application viewport 100' and the portion of the associated application window beneath the viewport is displayed in the viewport 100', via step 206. FIG. 8*a* shows the viewport 100' now associated with the selected application 108.

The user can then size and locate the application viewport 100' to see relevant portions of the associated application 108, via step 208. Finally, the user can click the close button 106' to deactivate the application viewport 100', via step 210.

Figure 9:
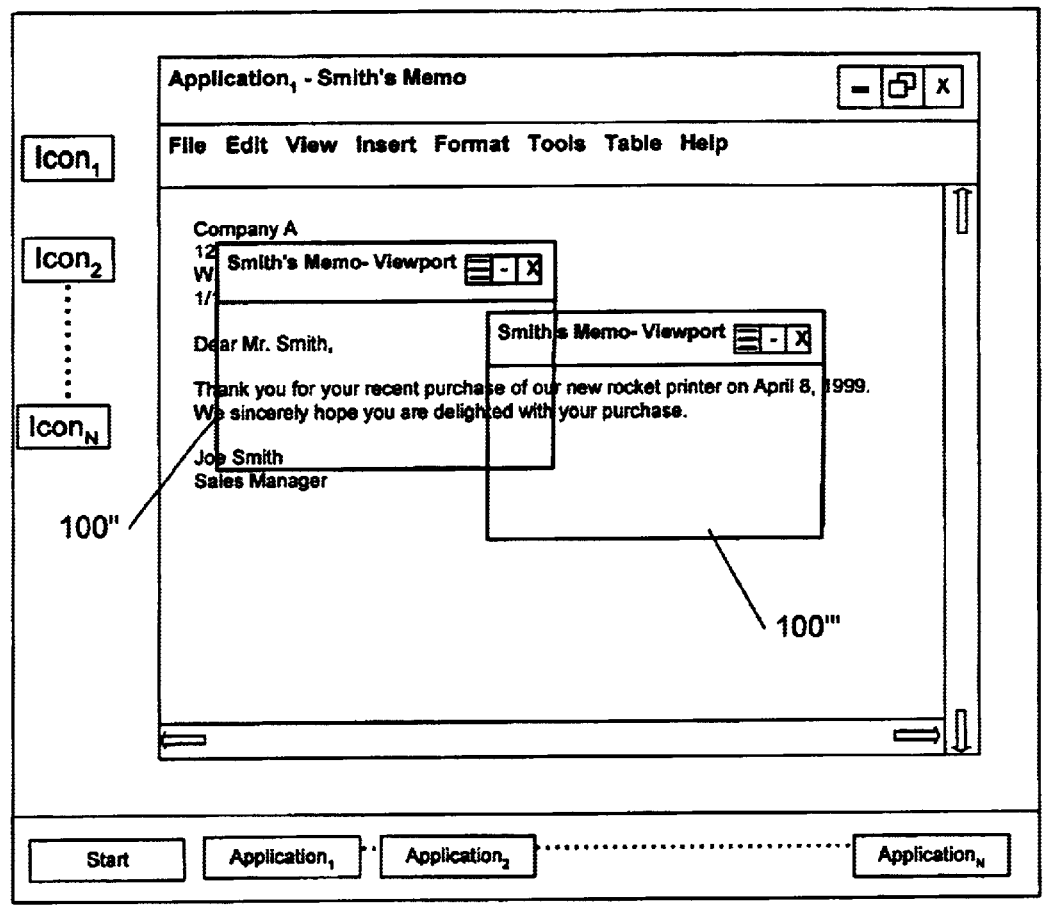
FIG. 9 represents another embodiment of a method and system in accordance with the present invention.

FIG. 9 illustrates another embodiment of the system and method in accordance with the present invention. In the embodiment of FIG. 9, the user has the ability to create multiple application viewports 100", 100'". A related "minimize all" button is preferably located in the title bar of the viewports and allows the user to reduce all application viewports on the desktop to an icon in the taskbar. A subsequent mouse click of the icon, makes all the application viewports visible again. Left mouse clicking on any one of the application viewports makes that viewport the current viewpoint and makes it eligible to receive a new association.

A further enhancement of the application viewport provides for "capturing" needed information when it becomes visible within the application viewport. This can be accomplished by "right clicking" the mouse within the application viewport. The information displayed within the application viewport is now frozen and constant and the "captured" information may be relocated anywhere by simply moving the viewport to any desired location on the desktop.

Figure 10:
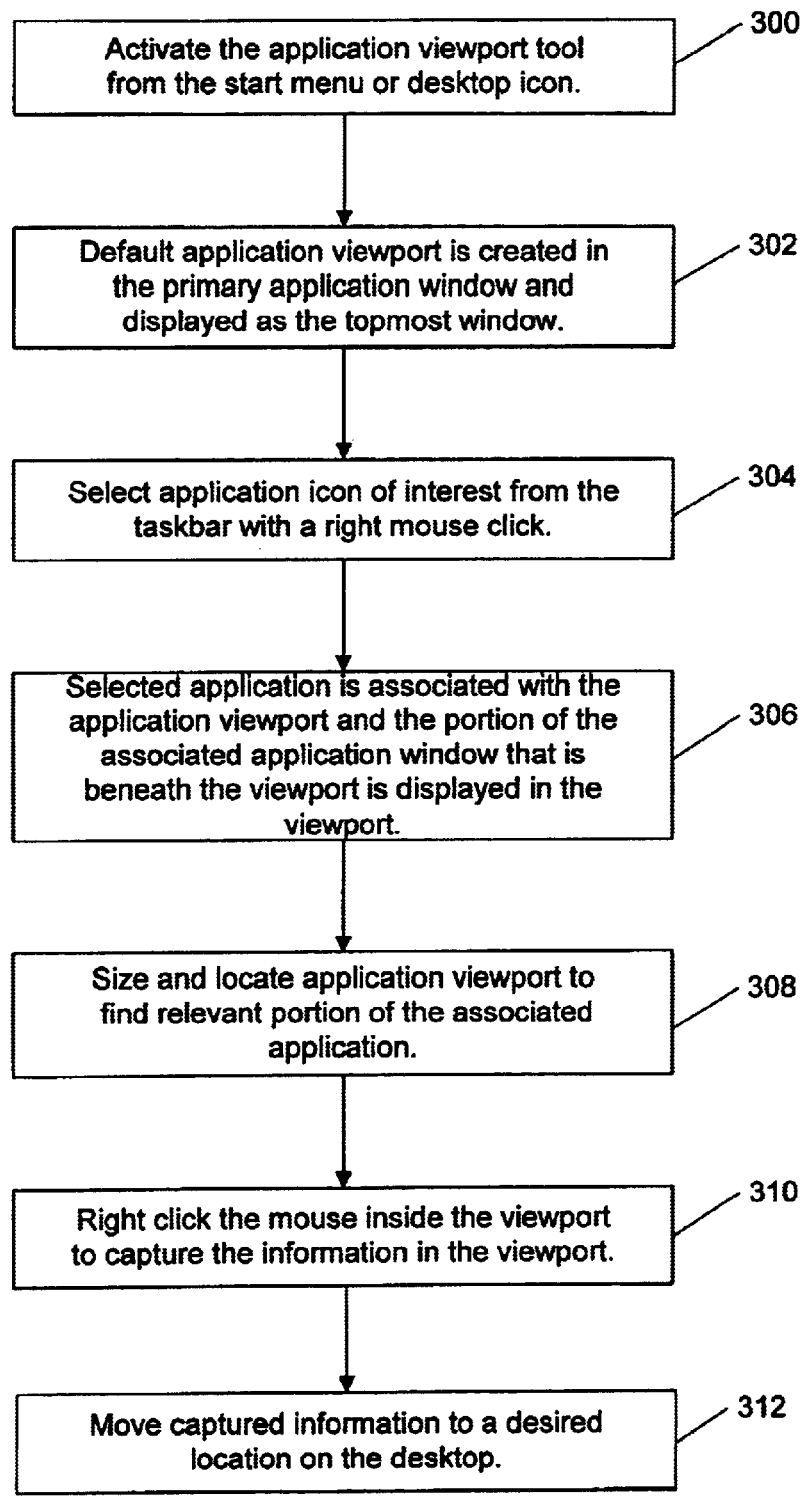
FIG. 10 represents a flowchart of the operation of the capture feature of the method and system in accordance with the present invention.

To describe the operation of the "capture" feature of this invention refer back to FIG. 8*a* and to FIG. 10. FIG. 10 is a flowchart of the operation of the capture feature. The application viewport 100' contains a portion of an associated application 108 and is displayed as the topmost window in the primary application window 110. The taskbar 222 preferably contains currently launched application icons.

Figure 11:
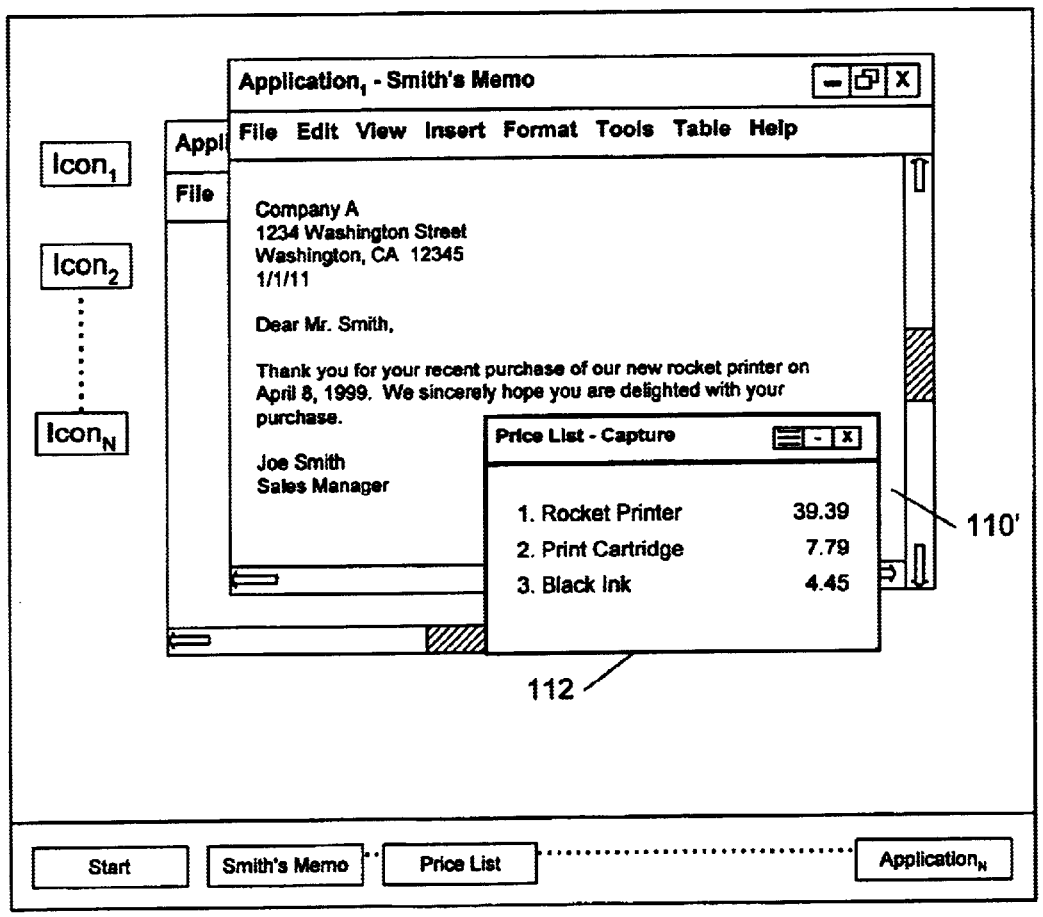
FIG. 11 represents an application configuration illustrative of the capture feature of the method and system in accordance with the present invention.

Referring now to FIGS. 8*a* and 10, once a user decides to capture information from a previously hidden application window, the user activates the application viewport tool, via step 300. Next, the application viewport 100' is created with an initial default size in the primary application window as the topmost window, via step 302. The user then selects the application icon of interest from the taskbar 222, via step 304. Next, the selected application 108 is associated with the application viewport 100' and the portion of the associated application window beneath the viewport is displayed in the viewport 100', via step 306. The user then sizes and locates the application viewport 100' to a desired location to find the relevant information of the associated application 108, via step 308. Finally, the user "right clicks" the mouse inside the viewport to create a capture window, via step 310. The "captured" information in the capture window can now be relocated on the desktop to a desired location, via step 312. FIG. 11 depicts the "capture" window 112 that has been relocated to a new location on the desktop.

Note that the capture window no longer functions as a viewport in that the captured information within the captured window remains constant as the capture window is moved on the display. Further, the associated application window remains unchanged in response to a capture operation. In addition, information within the capture window is available for conventional cut and paste operations.

This is a nice feature in that it allows the user to "capture" pieces of information scattered at various locations from within hidden window across multiple applications and collect them into one area of the desktop, thereby making available a multitude of reference information while viewing the primary application. The capture window can be immediately restored to its normal state of operation (e.g. viewport) by simply "double clicking" on it.

The system and method in accordance with the present invention allows the user to view the contents of application windows that would otherwise be hidden. Through the use of the present invention a user can simultaneously view information from multiple applications where the primary application window is partially or wholly covering needed information in an underlying window. Furthermore, the user will also be able to view application windows that are not directly underneath the primary application window, but are in an inactive state. This will provide the user with the ability to quickly access needed information without having to undergo the time consuming process of resizing or rearranging desktop window configurations.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for displaying hidden information on a display screen, the display screen displaying a plurality of application windows, a first window of the plurality of application windows obscuring the hidden information within a second window of the plurality of application windows, the method comprising:

a) creating a viewport as a topmost window in response to a first user interaction, wherein the viewport is moveable to any point on the display screen independent from the plurality of application windows;

b) associating the second application window with the viewport in response to a second user interaction;

c) displaying the hidden information in the viewport whenever the viewport is positioned over the hidden information; and d) capturing at least a portion of the hidden information displayed in the viewport as static information in the viewport.

2. The method of claim 1, wherein a third application window obscures the hidden information within the second window.

3. The method of claim 1 wherein the displaying step (c) includes displaying a portion of the hidden information.

4. The method of claim 1 wherein the creating step (a) includes providing an application viewport tool.

5. The method of claim 1 further comprising:

(e) relocating the viewport wherein a first portion of the display occupied by the viewport and displaying the hidden information is restored to a normal display of the first application window upon moving the viewport to a second portion of the display that is not contiguous with the first portion.

6. The method of claim 1 wherein the hidden information displayed within the viewport becomes invariant in response to a user interaction.

7. The method of claim 6 further comprising:
(e) relocating the viewport from a first portion of the display to a second portion of the display; and
(f) continuing to display the invariant hidden information within the viewport.

8. The method of claim 1 wherein the viewport can be resized.

9. The method of claim 1 wherein the viewport includes a plurality of viewports.

10. A The method of claim 1 wherein movement of the viewport can be used to scroll information within the second window without making the second window active.

11. A system for displaying hidden information on a display screen, the display screen displaying a plurality of application windows, a first window of the plurality of application windows obscuring the hidden information within a second window of the plurality of application windows, the system comprising:
means for creating a viewport as a topmost window in response to a first user interaction, wherein the viewport is moveable to any point on the display screen independent from the plurality of application windows;
means for associating the second application window with the viewport in response to a second user interaction;
means for displaying the hidden information in the viewport whenever the viewport is positioned over the hidden information; and
means for capturing at least a portion of the hidden information displayed in the viewport as static information in the viewport.

12. The system of claim 11, wherein a third application window obscures the hidden information within the second window.

13. The system of claim 11 wherein the displaying means includes means for displaying a portion of the hidden information.

14. The system of claim 11 wherein the creating means includes means for providing an application viewport tool.

15. The system of claim 11 further comprising:
means for relocating the viewport wherein a first portion of the display occupied by the viewport and displaying the hidden information is restored to a normal display of the first application window upon moving the viewport to a second portion of the display that is not contiguous with the first portion.

16. The system of claim 11 wherein the hidden information displayed within the viewport becomes invariant in response to a user interaction.

17. The system of claim 16 further comprising:
means for relocating the viewport from a first portion of the display to a second portion of the display; and
means for continuing to display the invariant hidden information within the viewport.

18. The system of claim 11 wherein the viewport can be resized.

19. The system of claim 11 wherein the viewport includes a plurality of viewports.

20. The system of claim 11 wherein movement of the viewport can be used to scroll information within the second window without making the second window active.

21. A computer readable medium containing program instructions for displaying hidden information on a display screen, the display screen displaying a plurality of application windows, a first window of the plurality of application windows obscuring the hidden information within a second window of the plurality of application windows, the program instructions which when executed by a computer system cause the computer system to execute a method comprising:
a) creating a viewport as a topmost window in response to a first user interaction, wherein the viewport is moveable to any point on the display screen independent from the plurality of application windows;
b) associating the second application window with the viewport in response to a second user interaction;
c) displaying the hidden information in the viewport whenever the viewport is positioned over the hidden information; and
d) capturing at least a portion of the hidden information displayed in the viewport as static information in the viewport.

22. The computer readable medium of claim 21, wherein a third application window obscures the hidden information within the second window.

23. The computer readable medium of claim 21 wherein the displaying step (c) includes displaying a portion of the hidden information.

24. The computer readable medium of claim 21 wherein the creating step (a) includes providing an application viewport tool.

25. The computer readable medium of claim 21 further comprising:
(e) relocating the viewport wherein a first portion of the display occupied by the viewport and displaying the hidden information is restored to a normal display of the first application window upon moving the viewport to a second portion of the display that is not contiguous with the first portion.

26. The computer readable medium of claim 21 wherein the hidden information displayed within the viewport becomes invariant in response to a user interaction.

27. The computer readable medium of claim 26 further comprising:
(e) relocating the viewport from a first portion of the display to a second portion of the display; and
(f) continuing to display the invariant hidden information within the viewport.

28. The computer readable medium of claim 21 wherein the viewport can be resized.

29. The computer readable medium of claim 21 wherein the viewport includes a plurality of viewports.

30. The computer readable medium of claim 21 wherein movement of the viewport can be used to scroll information within the second window without making the second window active.

31. A method for displaying hidden information on a display screen, the display screen displaying a plurality of application windows, a first window of the plurality of application windows obscuring the hidden information within a second window of the plurality of application windows, the method comprising:
a) creating a viewport as a topmost window in response to a first user interaction, wherein the viewport includes a minimize all button, and wherein the viewport is moveable to any point on the display screen independent from the plurality of application windows;

b) associating the second application window with the viewport in response to a second user interaction;

c) displaying the hidden information in the viewport whenever the viewport is positioned over the hidden information; and d) capturing at least a portion of the hidden information displayed in the viewport as static information in the viewport.

32. A system for displaying hidden information on a display screen, the display screen displaying a plurality of application windows, a first window of the plurality of application windows obscuring the hidden information within a second window of the plurality of application windows, the system comprising:

means for creating a viewport as a topmost window in response to a first user interaction, wherein the viewport includes a minimize all button, and wherein the viewport is moveable to any point on the display screen independent from the plurality of application windows;

means for associating the second application window with the viewport in response to a second user interaction;

means for displaying the hidden information in the viewport whenever the viewport is positioned over the hidden information; and means for capturing at least a portion of the hidden information displayed in the viewport as static information in the viewport.

* * * * *